(12) United States Patent
Gravelle et al.

(10) Patent No.: US 7,778,876 B2
(45) Date of Patent: Aug. 17, 2010

(54) COMMUNITY CONCEPT FOR PAYMENT USING RF ID TRANSPONDERS

(75) Inventors: Kelly Gravelle, San Diego, CA (US); Ron Pinkus, Plano, TX (US); Michael Burchell, Plano, TX (US)

(73) Assignee: TC License Ltd., Hummelstown, PA (US)

( * ) Notice: Subject to any disclaimer, the term of this patent is extended or adjusted under 35 U.S.C. 154(b) by 647 days.

(21) Appl. No.: 11/084,162

(22) Filed: Mar. 21, 2005

(65) Prior Publication Data
US 2005/0218214 A1    Oct. 6, 2005

Related U.S. Application Data

(63) Continuation of application No. 09/864,442, filed on May 25, 2001, now abandoned.

(51) Int. Cl.
*G06Q 20/00* (2006.01)
(52) U.S. Cl. .............................. 705/17; 705/13; 705/14; 705/26; 235/381; 235/384
(58) Field of Classification Search ........................ None
See application file for complete search history.

(56) References Cited

U.S. PATENT DOCUMENTS

| | | | |
|---|---|---|---|
| 5,144,553 A | 9/1992 | Hassett et al. | |
| 5,495,981 A | 3/1996 | Warther | |
| 5,819,234 A | 10/1998 | Slavin et al. | |
| 5,892,441 A | 4/1999 | Woolley et al. | |
| 5,899,980 A | 5/1999 | Wilf et al. | |
| 6,073,840 A | 6/2000 | Marion | |
| 6,116,505 A * | 9/2000 | Withrow | 235/381 |
| 6,332,128 B1 | 12/2001 | Nicholson | |
| 6,354,493 B1 | 3/2002 | Mon | |
| 6,366,220 B1 | 4/2002 | Elliott | |
| 6,446,049 B1 | 9/2002 | Janning et al. | |
| 7,128,652 B1 * | 10/2006 | Lavoie et al. | 463/42 |
| 2001/0049626 A1 * | 12/2001 | Nicholson | 705/14 |

OTHER PUBLICATIONS

Cox, Tracy. "Smart-card revolution." National Petroleum News, vol. 91, No. 5, p. 32 (2), May 1999.*

* cited by examiner

*Primary Examiner*—F. Zeender
*Assistant Examiner*—Fawaad Haider
(74) *Attorney, Agent, or Firm*—Caesar, Rivise, Bernstein, Cohen & Pokotilow, Ltd.

(57) ABSTRACT

Payment systems and methods using wireless transponders in a community of retailers are disclosed. The disclosed systems and method include a community of retailers, an RFID transponder card, a number of readers for reading an identification number from the RFID transponder card when a subscriber carrying the card enters the community, a local computer in communication with the plurality of points of sale for receiving the identification number and associating the identification number with a subscriber account, and a Clearinghouse computer for validating the transponder card and notifying the local computer of the card's validation.

7 Claims, 2 Drawing Sheets

COMMUNITY CONCEPT FOR PAYMENT USING RF ID TRANSPONDERS

This application is a continuation of U.S. patent application Ser. No. 09/864,442, filed May 25, 2001, now abandoned.

BACKGROUND OF THE INVENTION

1. Field of the Invention

The present invention relates to automatic payment systems, and more particularly, to a payment system that uses RF ID transponders.

2. Description of the Prior Art

One way that merchants attract consumers to their businesses is by offering convenient and superior service. One example is the drive-through lane of a fast food restaurant which allows a customer to place an order, pay for the order, and receive the ordered food without leaving his or her vehicle. Other businesses such as gas stations and dry cleaners offer similar types of conveniences that are also based on the knowledge that many of their customers will likely be arriving in a vehicle. For example, a dry cleaner may have a drive-through service or convenient short-term parking stalls near the entrance of the establishment, providing the customer with easy access to the business.

Another convenience generally offered to consumers is the ability to use credit cards or bank debit cards for the payment of goods and services. Such cashless systems allow the consumer to remit payment without having to manually withdraw and carry cash from a bank. One drawback with credit cards is the lengthy processing time required to complete a credit card transaction. Although current processing times of cashless systems are considered acceptable in many environments, especially when large transactions are involved, most cashless systems are inefficient for applications such as fueling vehicles where the size of the transaction is small, the customer arrives in a vehicle, and/or the customer expects fast service.

Cashless systems have been developed to overcome some of the deficiencies of a standard credit card transaction. For example, in certain automated parking garages a customer is provided with a radio frequency identification (RFID) tag which identifies the customer to the proprietor of the parking garage. The RFID tag may take many forms, for example it may be attached to the vehicle, provided in a card, or in a key fob. When the customer enters the parking facility, the RFID tag is interrogated by a card reader which is located at the entrance of the parking garage close to an entrance gate. The card reader is connected to a host computer which checks stored user information associated with the ID number, authorizes the car to enter, and tracks the time that the car is parked in the garage. A local host computer maintains account information for the identified vehicle, which can be used to prepare periodic billing statements that are mailed to the customer. A proprietor may have more than one parking garage, with each local host computer connected to a single remote computer for the centralized production of billing statements.

Another example of this type of system is MOBIL SPEED-PASS™ which is used for the purchase of gasoline. The company issues RFID tags to its customers which identify the customer by an ID number. When a customer pulls up to a gas pump, the RFID tag is interrogated to receive the ID number of the tag. That number is sent via satellite to a host computer which authenticates the tag. If authorized, the host computer returns an authorization signal to enable the gasoline pump. The host computer charges a previously selected credit or bank debit card to pay for the gasoline that was actually pumped. After the credit or the bank debit card transaction is complete, a receipt is printed for the customer. The final transaction is then recorded in a central database which is used to track customer buying patterns.

A problem associated with the prior art is that for each register used by a merchants, there needs to be a an RFID tag reader associated with it. For example, each gas pump in a gas station that accepts payment through RFID tags must carry a tag reader. Therefore, there is a need in the art to simplify the system architecture of the existing cashless payment systems.

SUMMARY AND OBJECTS OF THE INVENTION

Systems and methods of the present invention enable real-time transactions between a subscriber carrying a wireless or RFID transponder card, and any retailer that is part of a community of retailers. More particularly, the payment system of the present invention includes a community comprised of a plurality of points of sale; a wireless transponder; at least one reader for interrogating the wireless transponder and for reading information from the transponder when the transponder is in a vicinity of the community; a local computer in communication with the plurality of points of sale for receiving the information from the at least one reader and associating the information with a subscriber account; and a Clearinghouse computer for conducting a validation of the transponder and sending a notification of said validation to the local computer.

The payment method of the present invention includes the steps of reading information from a wireless transponder when the transponder is located in a vicinity of a plurality of points of sale; relaying the information to a validating processor; identifying a subscriber account corresponding to the transponder information; and authorizing the wireless transponder corresponding to the identified subscriber account to make transactions with any points of sale from the plurality of points of sale.

An object of the present invention is to facilitate and expedite transactions, such as the payment of products, that are requested by a subscriber when the subscriber is in a community of retailers, such as a shopping mall. Another object of the present invention is to consolidate transactions such that the associated cost per transaction is reduced. Still another object of the present invention is to add security to a conventional payment transaction by requesting the input of secondary data from a subscriber before the transaction is completed.

With these and other objects, advantages and features of the invention that may become hereinafter apparent, the nature of the invention may be more clearly understood by reference to the following detailed description of the invention, the appended claims and to the accompanying drawings.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 1:
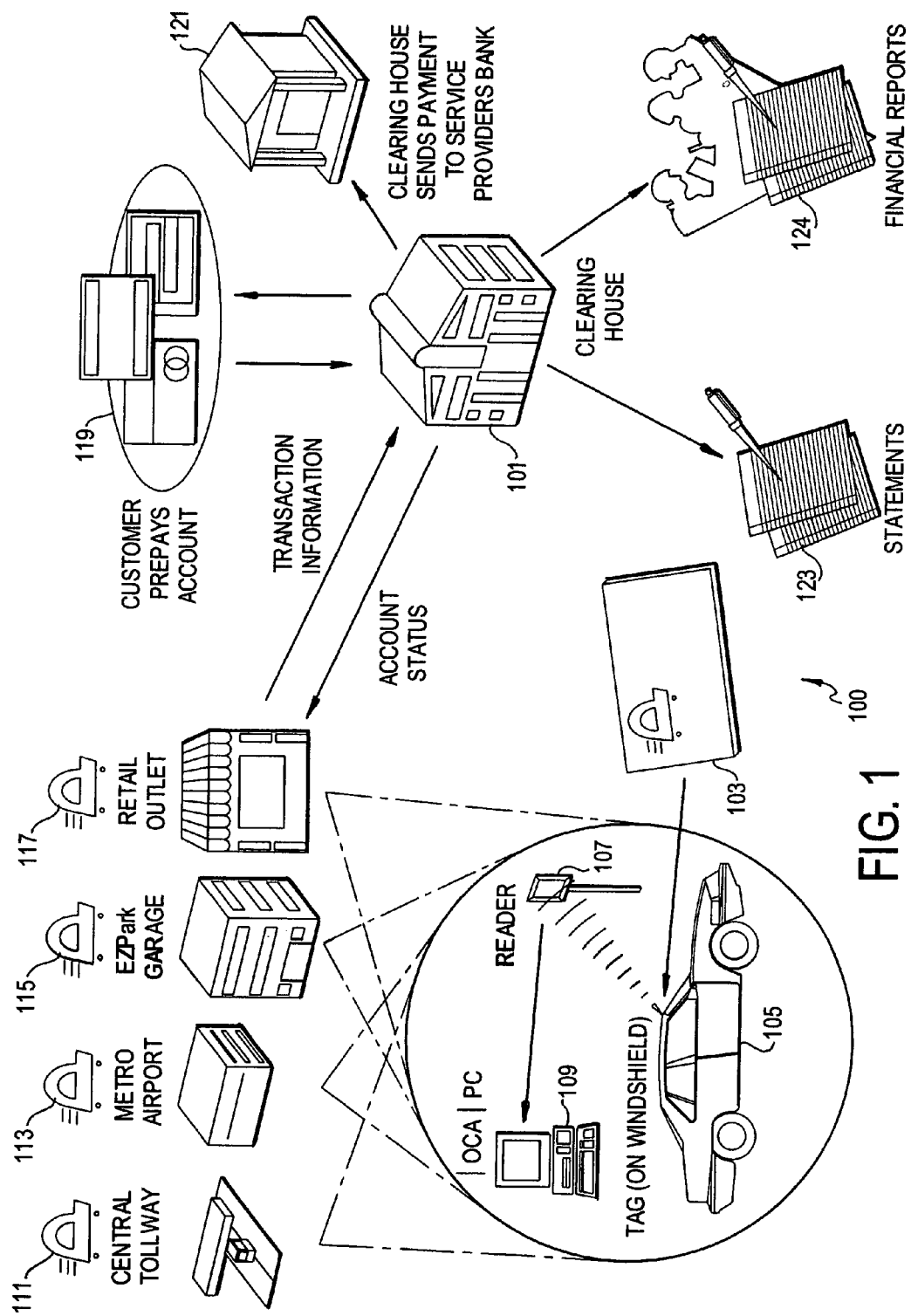
FIG. 1 is a view of the first embodiment of the payment system of the present invention.

The payment system of the present invention includes an RFID transponder mounted on a vehicle or carried by a person, an RFID reader, and a secondary data input device. The transponder ID is read from the transponder by a tag reader when it enters a community. After the read takes place, the secondary data input device is activated to finalize an electronic transaction, for example, a payment. For example, an RFID transponder mounted on a vehicle might be read at the entrance to a gas station. A validating processor or computer communicating with the reader then validates that RFID transponder as having a valid ID and account, and the information read is then stored in a file or database located at the validating computer. That validating computer may be local PC 109 in FIG. 1 or a processor located in the Clearinghouse 101. The preferred embodiment involves maintaining a simple and efficient (from a lookup time and memory perspective) flat file in the local PC 109. This is maintained with periodic update messages from the Clearinghouse 101. Updates to the flat file occur as frequently as required to deliver the required fidelity in the database. The advantage of this approach is that if communications are down or corrupted, the system will continue to be able to operate and validate transactions, albeit somewhat degraded by the aging of the data contained in the flat file.

Alternatively, validation could be done directly at the Clearinghouse 101. One disadvantage of this is that the network connection must be up all the time, dictating the need for a more reliable communication link that could be more expensive to operate. Further, the needs for an "always up" link might make it difficult to use the Internet as the dissemination network, since an always up connection increases the risk of being hacked in the current environment.

The data used for corroborating the identity of the RFID transponder, for example the ID number and the account number associated with that ID, may also be stored locally in the validating computer.

Once the transaction has been requested, it can be completed by cross-correlating the RFID transponder read with the secondary input data That is, in order to complete a transaction, the secondary data input device accepts data from the carrier of the RFID transponder and that secondary data is cross-correlated against the transponder ID to verify the identity of the carrier and thus complete the transaction.

In one embodiment of the present invention, the secondary data provided to the secondary data input device is a personal identification number (PIN). The PIN is part of the validation file. The PIN may be entered, for example, into an existing keypad at a fueling pump. If the entered PIN matches one of those in the local computer corresponding to a tag that has been read into the community, the associated account is used to settle the transaction. This feature of the present invention differs from the prior art (e.g., ATM machine) in which only one card is corroborated against one PIN. By having multiple active PINs, a more convenient use of the system is allowed because people can remember their own PIN, not an arbitrary number assigned to them. This PIN permits inexpensive localization of the transaction to a specific point, like a fuel pump, and it also provides high security against fraud and counterfeiting. A system to fully localize the transponder is more expensive to implement.

Other types of secondary data that may be used to cross-correlate the RFID transponder read include a bar code printed on a key fob, which may in turn be read by an in-store bar code reader, a low cost inductive key fob, another RFID transponder, a biometric sensor (such as one that encodes fingerprints or finger geometry) or a magnetic stripe card, etc.

Since the RFID transponder is identified well in advance of the transaction, all necessary authorizations and account checks with respect to the account corresponding to the transponder card can be made before the actual transaction takes place. As a result, the time that a customer waits to complete the transaction is reduced due to the pre-authorization, which in essence turns the transaction into a real-time transaction. That is, on-line verification at the time of finalizing the transaction is not required.

Patrons desiring to use the RFID transponder for effectuating the electronic transactions may sign up for activation of the RFID transponder card by registering over the Internet. As a condition for activation, a prepayment may be required as a precautionary measure against overcharging the account associated with the RFID transponder card. The card may be picked up at a participating retailer in the community. It is important to point out that the community may consist of a single retailer.

The system of the present invention may also include a service center that supports the participating retailers. The participating retailers are the primary interface for customer queries and concerns. The service center may also guarantee payment for all transactions validated, but all account management is done via participating retailers. No statements or bills are sent to the subscriber, but they will be made available through the Internet.

The method of the present invention involves the issuance of the RFID transponder card to a subscriber and the transactions involving the transponder card. The RFID transponder card includes an account index number electronically encoded in it. When applying for a subscriber account, a subscriber provides a choice of electronic settlement means such as a credit card or a debit card. The subscriber may also agree to a nominal initial deposit to his account of a certain amount which is debited from his settling account. The subscriber may also agree that as soon as the balance on the subscriber's account drops below a predetermined threshold, the service center is authorized to "top up" (i.e., replace the debited amount) the subscriber account from the settlement account. The subscriber will authorize that the threshold and the "top up" amounts may vary according to usage, for example. In this manner, the subscriber account balance will seldom become negative awaiting an authorization from the corresponding settling account.

When subscribers enter the community, their corresponding RFID transponder cards are read by any of the readers located in the community and connected to the point of sale systems of participating retailers. The information read is then relayed to a real-time validator. The real-time validator is a data processor that determines that the account identified is authorized to make transactions within the community.

When payment is due at one of the participating retailers in the community, the subscriber may only need to offer the cross-correlating input data to a secondary data input device. As mentioned before, this may be as simple as entering a PIN. The validator will then provide the participating retailer with an authorization code that guarantees the transaction. Transactions are posted to the service center until the subscriber's account falls below the specified threshold. The subscriber's account is subsequently topped up by debiting the associated settlement account.

FIG. 1 shows a first embodiment of the payment system 100 of the present invention. The system 100 includes an RFID transponder card (the card 103), a vehicle having the card 103 attached to its windshield; an RFID transponder card reader (reader 107); a local personal computer (PC 109); a number of participating retailers, namely, a central tollway 111, an airport 113, a parking garage 115, and a retail outlet 117. The system 100 further includes a Clearinghouse 101 and a banking facility 121.

The Clearinghouse 101, which is also referred to as the service center, may include computers and personnel to support the participating retailers for all transactions validated. The transactions may be validated in real-time by a dedicated processor ("the validator") located at the Clearinghouse location 101. Alternatively, the validator may be located at any of the locations of the participating retailers 111-117, or may be implemented as a software module running on the local PC 109.

The Clearinghouse 101 is also responsible for issuing a subscriber account. The card 103 associated with that subscriber account may be issued by the Clearinghouse 101 or by any one of the participating retailers 111-117. In the embodiment of FIG. 1, the card 103 is in the form of a windshield sticker. Any other embodiment that may carry an RFID tag may also be used as a potential transponder card that can be used with the payment system of the present invention. Once a vehicle 105 carrying the card 103 enters a community of participating retailers, the reader 107 reads information from the card 103 and forwards the information to a local PC 109. Only one local PC 109 is shown on FIG. 1 to illustrate the use of PC 109 by participating retailers 111-117, assuming they comprise the community. Alternatively, if the community is comprised of one participating retailer (e.g., that retailer location is too far from other participating retailers), then FIG. 1 would show a local PC 109 for each of the individual participating retailers 111-117. The local PC 109 reads the subscriber information from the card 103 and attempts to match the information to information in a subscriber database. The subscriber database resides at the Clearinghouse, although as mentioned above a limited sub-set of the data in the database may also be stored as a flat file in the local PC 109. The subscriber database includes the identification number of active cards and the corresponding account numbers of current subscribers. If a match between a read card 103 and one of the active cards in the database is found, the local PC validates the card 103. Once a card has been validated, a transaction can be requested through any POS terminal in the community. Further, the transaction will be authorized in real-time upon entering a secondary data input.

An account status corresponding to card 103 is sent to the community as soon as the card 103 is read. After the card has been validated and the transaction has been authorized, the transaction information is sent to the Clearinghouse 101. The Clearinghouse 101 serves as an intermediary between the POS and the ultimate source of funds (i.e., a settlement account such as a credit card, debit card, or bank account). Instead of requesting a withdrawal from that settlement account each time a transaction is completed, the Clearinghouse 101 may consolidate all the transactions finalized within a given community for a certain period of time, and request a single withdrawal. The user of the card 103 would still be able to view a record with individual transactions via statements 123 produced by the Clearinghouse 101. The statements 123 may be accessed through a web site.

The preferred embodiment of the present invention does not consolidate all the transactions into a single request for withdrawal. Instead, the preferred embodiment is to request a single withdrawal before any transaction involving the card 103 takes place. That single withdrawal is used to establish the subscriber account.

Regardless of when the single withdrawal from the settlement account takes place, the consolidation of transactions results in lower costs. For example, fees charged in connection to payment with a credit or debit card can also be consolidated. While debit card (ACH) transactions are based on a fixed fee, credit card transactions are based on a fixed fee and a percentage of the transaction. The method of the present invention consolidates, for example, low value transactions such that the fixed portion of the settlement cost is spread over multiple transactions, thus reducing the per transaction cost. The settlement cost may be defined as the cost to open subscriber's account paid in a single transaction by either debit or credit card or the amount of a single withdrawal after the transactions have been consolidated.

For small dollar value transactions this can be dramatic. A typical debit card transaction cost is $0.20. On a $2.00 transaction, this represents 10% of the total value of the transaction. If ten such transactions are consolidated, however, and a $20.00 withdrawal from the credit or debit card is made to deposit it into the subscriber's account, the cost drops to one percent (1%) of the value of the transaction. Further, because the Clearinghouse 101 processes a large volume of transactions, the operator of the Clearinghouse 101 may negotiate better fees than the individual participating retailers. The same advantage applies for credit card settlement at low dollar values, but is less dramatic at higher dollar transactions.

The Clearinghouse 101 essentially holds the account data that is required to clear the transaction from the transponder in the lane, and then routes that transaction for final settlement according to the data on the account associated with the transponder. In some cases this can be also done at the front end, where for example the flat file may have a credit card number associated with the tag. If the tag is set up as a pass-through account, this data will be routed to the participating bank for clearance. This may occur in the back office for each transaction. Alternatively, a pre-paid account may be used and when a low balance threshold is crossed the Clearinghouse 101 will then top up the account from a designated source such as a credit or debit transaction with a Bank 119, or via an ACH transaction directly into the customer's bank 121 account. Essentially the Clearinghouse 101 is a big switch that applies business rules associated with the settlement of a given transaction.

Figure 2:
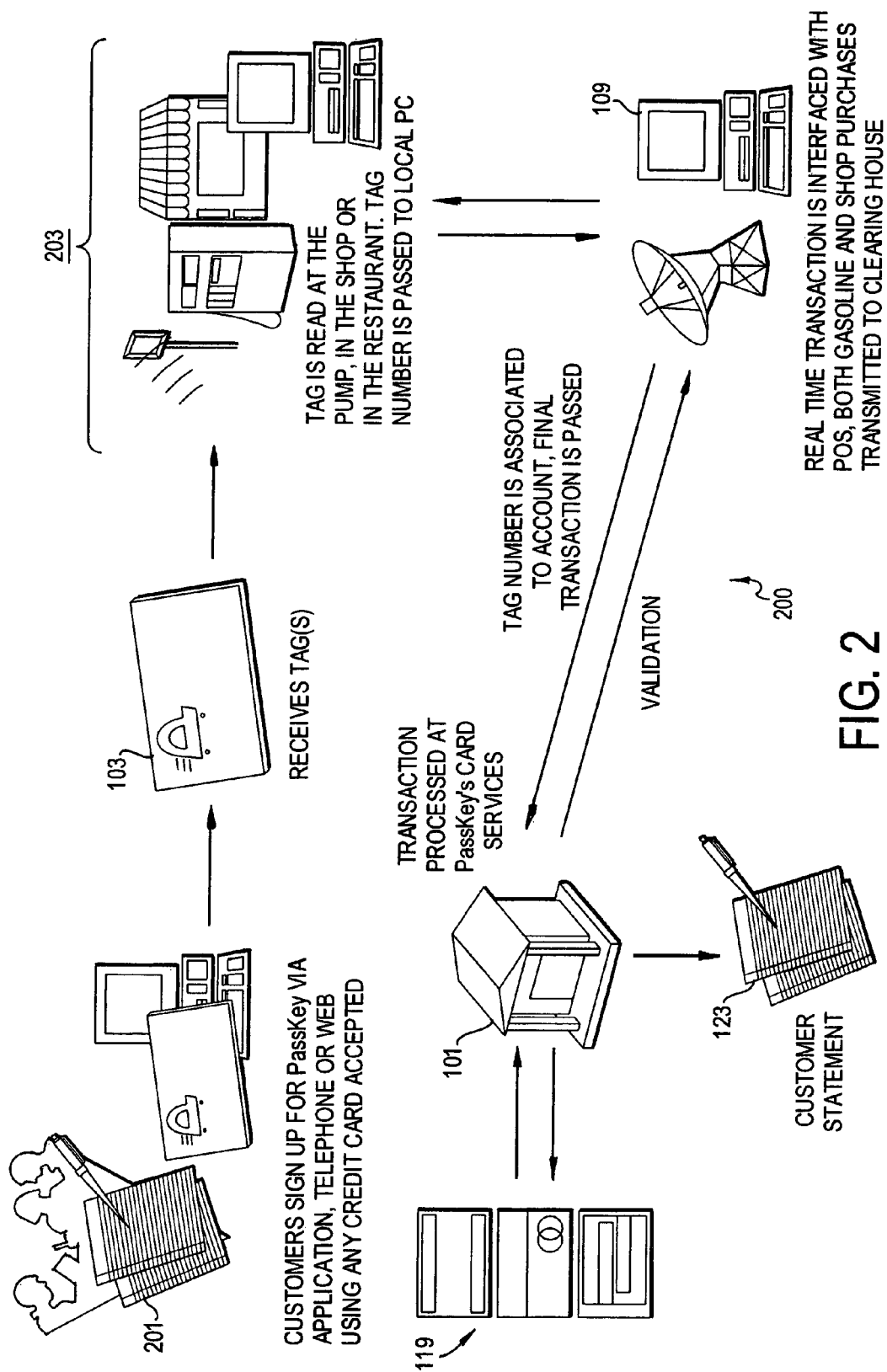
FIG. 2 is a view of the payment method of the present invention.

FIG. 2 illustrates a process for conducting transactions with the system of FIG. 1. The first step 201 in the process is to have applicants subscribe to the system by filling out an application. The application may be completed by telephone or via the Internet. As part of the application process, the potential subscriber may provide a credit card number or debit card number which may be used to establish the subscriber's account. The funds required as part of the completion of each transaction within the community 203 will be withdrawn from the subscriber's account.

After the application is processed, the applicant becomes a subscriber and can thus receive card 103. Once the subscriber receives the card 103, the subscriber may enter the community 203 to carry out transactions with card 103. At least one of a number of readers in the community will read the card 103 when the card is in the vicinity of those readers, thus indicating that the subscriber is in the community. The information in card 103 is then passed from the reader 107 to the local PC 109.

In the local PC 109, the reader card information is associated with an account. That account number is then sent to the Clearinghouse 101, where it is validated. The Clearinghouse sends the local PC 109 a notification of the validation. Alternatively, the tag may be validated at the local PC 109.

When the subscriber decides to complete a transaction, for example a purchase, the subscriber need only show the card 103 to a primary data input device, such as a reader 107, connected to the POS device to complete the transaction. After a merchant enters the price of the transaction in the POS device, the transaction is completed in real-time upon a reading of the card 103 since the card has already been validated. For security purposes, a PIN may be entered by the subscriber into the POS device for corroboration against the subscriber's account.

The card 103 may have a duplicate that is placed on the windshield of the subscirber's car. In this manner, the windshield card is first read to indicate the presence of the subscriber in the community, while the card being carried by the subscriber is read when the transaction takes place.

Once completed, the transaction information is passed from the POS to the local PC 109, to the Clearinghouse 101. The Clearinghouse may in turn pass the transaction information to the credit/debit card service provider 119 or may consolidate several transactions before doing so.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. A payment method comprising: reading information from a wireless identification tag when the tag enters a community including a plurality of points of sale, the points of sale for processing a transaction including a request for transaction and authorization for transaction; initiating an authorization process based on the information read from the tag by a reader before a carrier of the tag reaches any of the plurality of points of sale; associating a subscriber with the information read from the wireless identification tag; validating the wireless identification tag; receiving a transaction request from a first point of sale, the first point of sale being the first point of sale from the plurality of points of sale with access to the wireless identification tag or the carrier of the wireless identification tag, the reader being separate and spaced apart from the points of sale and placed at the entrance of the community to read from the wireless identification tag before the carrier of the wireless identification tag reaches the first point of sale; authorizing a payment with the wireless identification tag at the first point of sale upon cross-correlating secondary data provided by a carrier of the wireless identification tag to the information read from the tag; selecting a source of funds for payment with the tag, wherein validating comprises: searching for active subscriber account numbers; and approving the payment if the information from the tag corresponds to an active subscriber account; forwarding a subscriber account status to a local computer associated with the plurality of points of sale immediately after reading information from the tag; consolidating payments with the tag into a single payment before selecting the source of funds; and authorizing transactions at second and subsequent points of sale within the community in real time upon validation of the authenticity of the carrier of the tag at the respective subsequent points of sale within the community.

2. The method of claim 1, further comprising selecting a source of funds for payment with the tag, wherein the selecting a source of funds comprises selecting a subscriber account when a pre-paid balance in the subscriber account exceeds an amount due at payment.

3. The method of claim 1, wherein the selecting a source of funds comprises selecting a credit account when a low balance threshold in a subscriber account does not exceed an amount due at payment.

4. The method of claim 1, wherein the selecting a source of funds comprises selecting a check card account when a pre-paid balance in a subscriber account does not exceed an amount due at payment.

5. The method of claim 1, further comprising topping up a subscriber account and selecting the subscriber account.

6. The method of claim 5, wherein topping up the subscriber account comprises: transferring funds from a secondary account into the subscriber account when a balance in the subscriber account does not exceed an amount due at payment.

7. The method of claim 5, wherein the topping up the subscriber account comprises: transferring funds from a secondary account into the subscriber account when a balance in the subscriber account is below a predetermined threshold.

* * * * *